United States Patent
Markley et al.

(10) Patent No.: US 6,852,049 B2
(45) Date of Patent: Feb. 8, 2005

(54) RATCHETING HYDRAULIC CHAIN TENSIONER WITH ROTATIONAL RESET AND LOCKING MEANS

(75) Inventors: George L. Markley, Montour Falls, NY (US); Kent S. Sawyer, Dryden, NY (US)

(73) Assignee: Borgwarner Inc., Auburn Hills, MI (US)

( * ) Notice: Subject to any disclaimer, the term of this patent is extended or adjusted under 35 U.S.C. 154(b) by 104 days.

(21) Appl. No.: 10/350,517

(22) Filed: Jan. 24, 2003

(65) Prior Publication Data

US 2004/0147349 A1 Jul. 29, 2004

(51) Int. Cl.[7] ............................................. F16H 7/22
(52) U.S. Cl. ...................................... 474/109; 474/110
(58) Field of Search ........................ 474/109–111, 101, 474/140

(56) References Cited

U.S. PATENT DOCUMENTS

| | | | |
|---|---|---|---|
| 4,713,043 A | 12/1987 | Biedermann | 474/111 |
| 4,881,927 A | 11/1989 | Suzuki | 474/110 |
| 5,073,150 A | 12/1991 | Shimaya | 474/110 |
| 5,304,099 A | 4/1994 | Deppe et al. | 474/110 |
| 5,366,415 A * | 11/1994 | Church et al. | 474/110 |
| 5,577,970 A | 11/1996 | Smith et al. | 474/110 |
| 5,595,549 A | 1/1997 | Jarrand | 474/91 |
| 5,911,641 A * | 6/1999 | Sheren et al. | 474/109 |
| 6,120,402 A | 9/2000 | Preston et al. | 474/109 |
| 6,244,981 B1 * | 6/2001 | Simpson | 474/110 |
| 6,634,973 B1 * | 10/2003 | Simpson et al. | 474/109 |
| 2001/0009876 A1 | 7/2001 | Kurohata | 474/110 |
| 2001/0009877 A1 | 7/2001 | Kurohata | 474/110 |
| 2004/0067806 A1 * | 4/2004 | Markley et al. | 474/110 |

FOREIGN PATENT DOCUMENTS

| | | | | |
|---|---|---|---|---|
| DE | 3325838 A1 * | 1/1985 | | 474/111 |
| DE | 10014700 A1 * | 10/2001 | | F16H/7/08 |
| EP | 0106325 | 11/1987 | | |

* cited by examiner

*Primary Examiner*—Marcus Charles
(74) *Attorney, Agent, or Firm*—Brown & Michaels, PC; Greg Dziegielewski

(57) ABSTRACT

A hydraulic chain or belt tensioner includes a ratchet-pawl interface on the piston skirt that can be reset to a locked position by rotating the piston and compressing it until locked. The tensioner preferably includes at least one flat on the piston. The flat prevents the piston from rotating axially and locks the piston into place. The locked position is especially useful for shipping the tensioner.

10 Claims, 5 Drawing Sheets

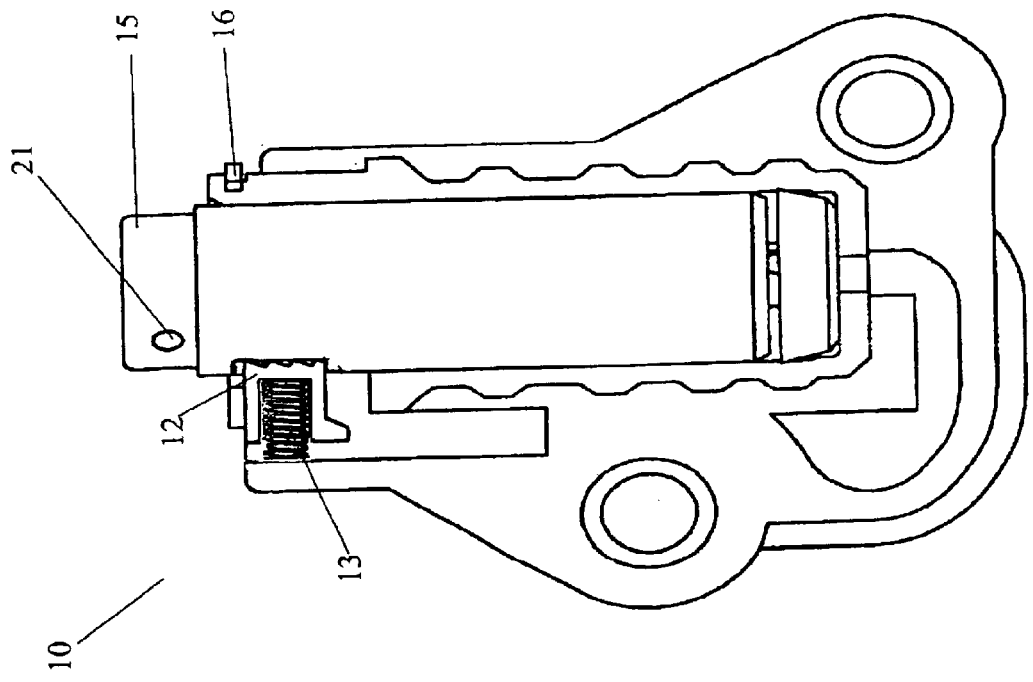
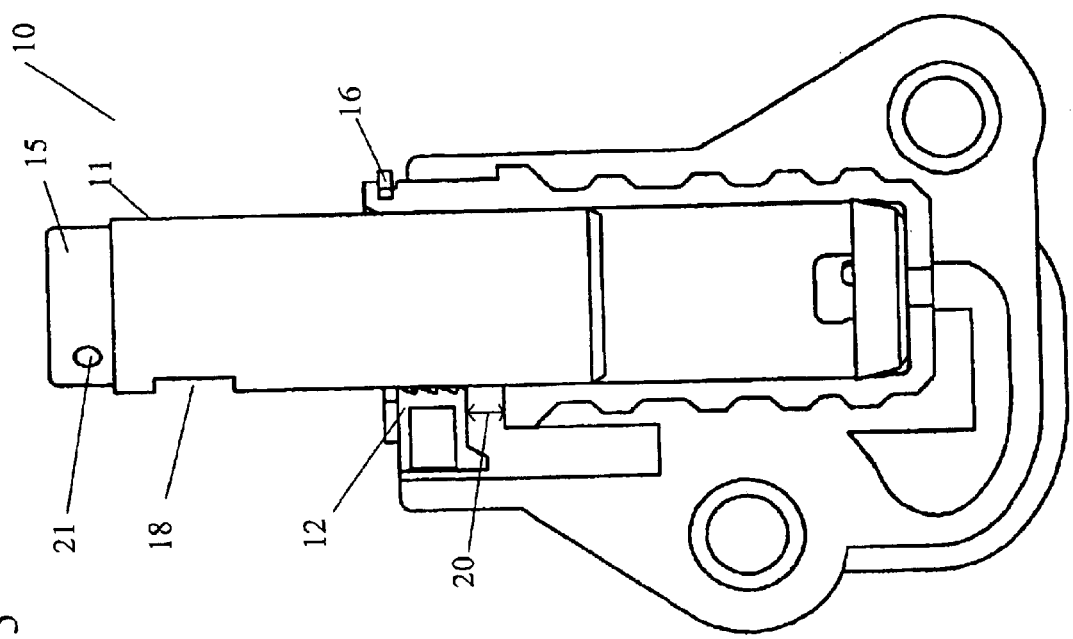

RATCHETING HYDRAULIC CHAIN TENSIONER WITH ROTATIONAL RESET AND LOCKING MEANS

BACKGROUND OF THE INVENTION

1. Field of the Invention

The present invention relates generally to tensioners used with chain drives in automotive timing and power transmission applications. In particular, the present invention is related to a hydraulic chain tensioner system.

2. Description of Related Art

A tensioning device, such as a hydraulic tensioner, is used as a control device for a power transmission chain, or similar power transmission devices, as the chain travels between a plurality of sprockets. In this device, the chain transmits power from a driving shaft to a driven shaft, so that part of the chain is slack and part of the chain is tight. Generally, it is important to impart and maintain a certain degree of tension in the chain to prevent noise, slippage, or the unmeshing of teeth in the case of a toothed chain. Prevention of such slippage is particularly important in the case of a chain driven camshaft in an internal combustion engine because jumping of teeth will throw off the camshaft timing, possibly causing damage or rendering the engine inoperative.

However, in the harsh environment of an internal combustion engine, various factors can cause fluctuations in the chain tension. For instance, wide variations in temperature and thermal expansion coefficients, among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tensions. Reverse rotation of an engine, occurring for example in stopping or in failed attempts at starting, can also cause fluctuations in chain tension. For these reasons, a mechanism is desired to remove excessive tensioning forces on the tight side of the chain and to ensure the necessary tension on the slack side of the chain.

Using hydraulic tensioners is a common method of maintaining proper chain tension. In general, these mechanisms employ a lever arm that pushes against the chain on the slack side of the power transmission system. This lever arm must push toward the chain, tightening the chain when the chain is slack, and must be very rigid when the chain tightens.

To accomplish this result, a hydraulic tensioner typically comprises a rod or cylinder as a piston, which is biased in the direction of the chain by a tensioner spring. The piston is housed within a cylindrical housing, having an interior space which is open at the end facing the chain and closed at the other end. The interior space of the housing contains a pressure chamber in connection with a reservoir or exterior source of hydraulic fluid pressure. The pressure chamber is typically formed between the housing and the piston, and it expands or contracts when the piston moves within the housing.

Blade and block tensioners have been used in the past to apply tension to chains. A block tensioner (1) as known in the prior art is shown in FIG. 1. The tensioner (1) has a piston (2) located within a housing (5). The springs (3) are located in a fluid chamber (4) within the piston (2). The tensioner (1) also includes a pawl (6) and ratchet teeth (7).

SUMMARY OF THE INVENTION

A hydraulic chain or belt tensioner includes a ratchet-pawl interface on the piston skirt that can be reset to a locked position by rotating the piston and compressing it until locked. The tensioner preferably includes at least one flat on the piston. The flat prevents the piston from rotating axially and locks the piston into place. The locked position is especially useful for shipping the tensioner.

BRIEF DESCRIPTION OF THE DRAWINGS

FIG. 5 shows a partial section of the tensioner of the present invention, where the piston is rotated to align locking flat and pawl.

FIG. 6 shows a partial section of the tensioner of the present invention, where the piston is compressed into the locked position.

DETAILED DESCRIPTION OF THE INVENTION

Figure 2:
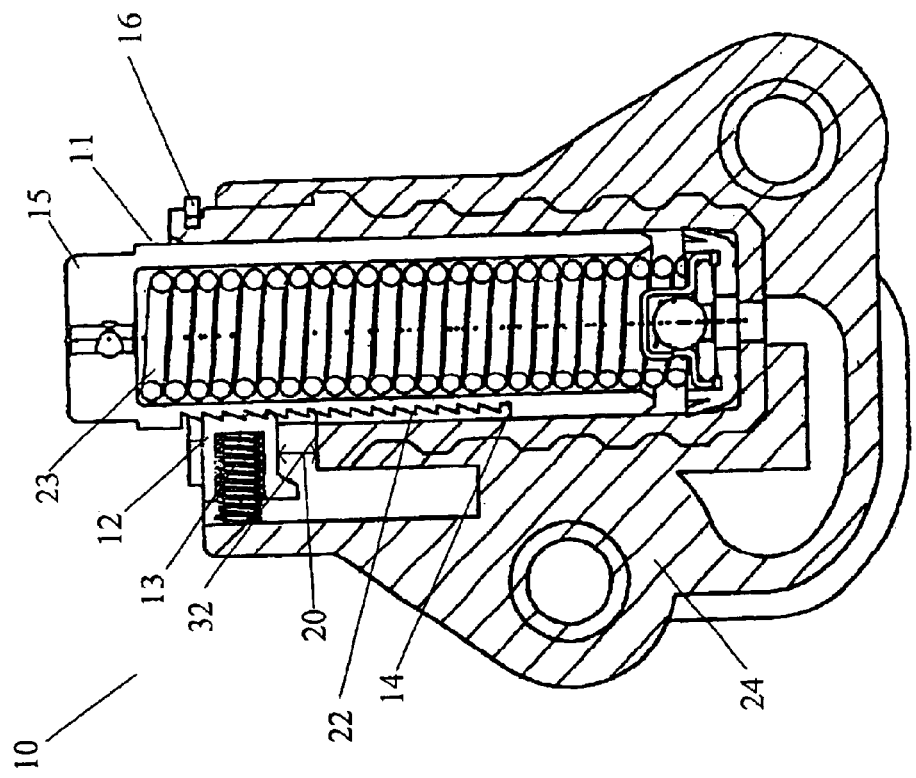
FIG. 2 shows a cross sectional view of the tensioner of the present invention in a compressed but unlocked state.
Figure 1:
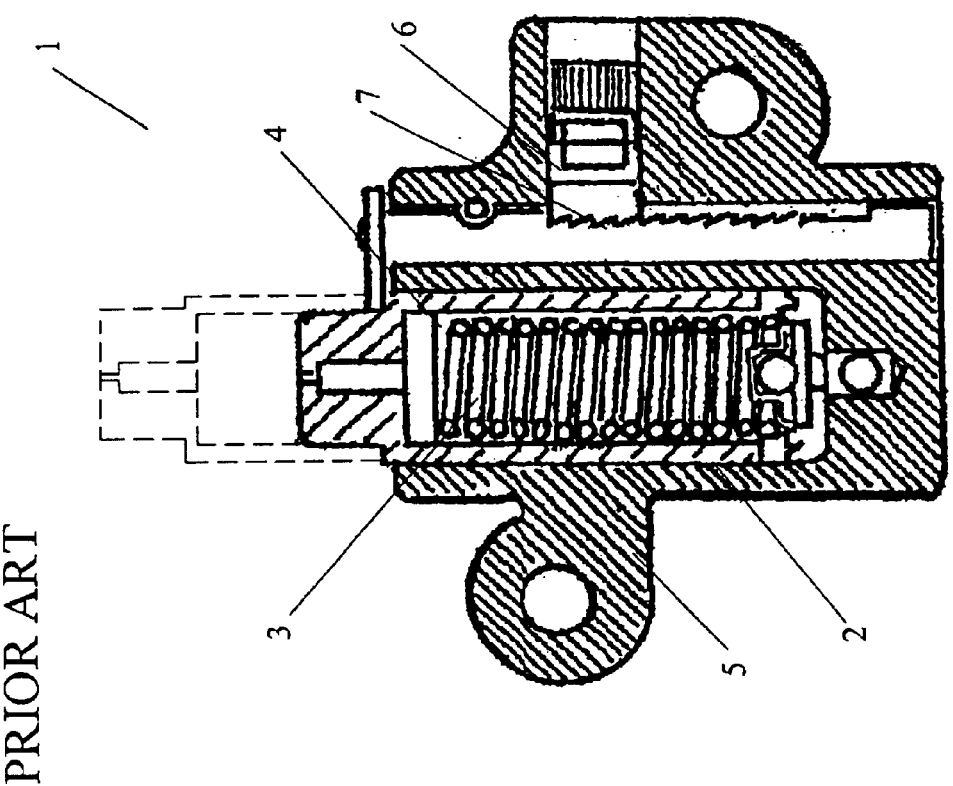
FIG. 1 shows a cross sectional view of a prior art block tensioner with a ratchet mechanism.
Figure 4:
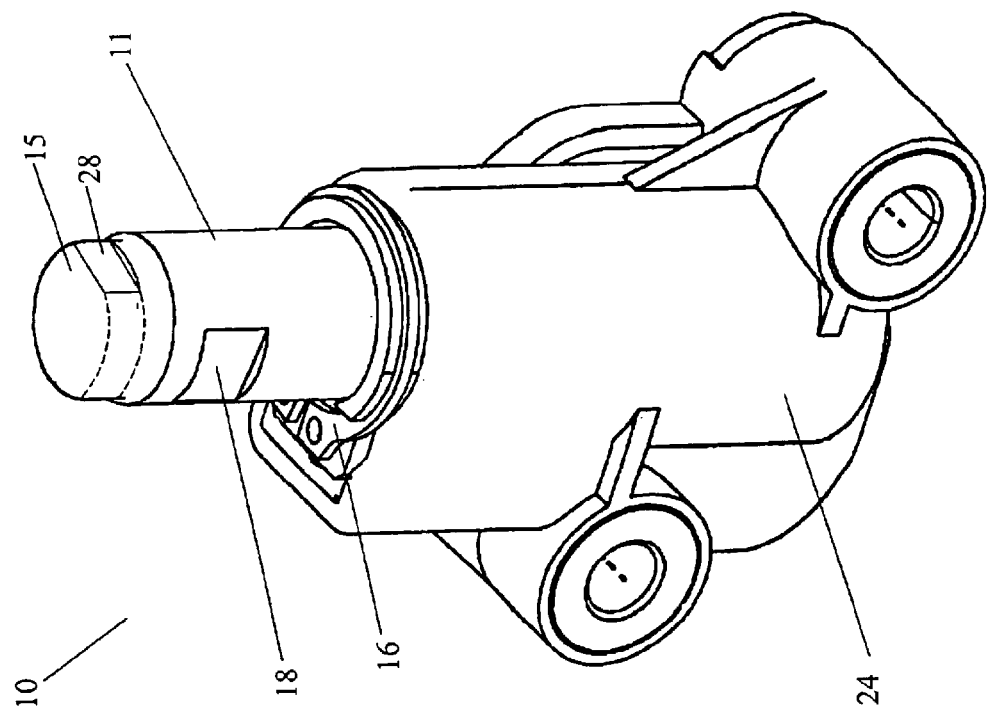
FIG. 4 shows an isometric view of FIG. 3, showing the locking flat and optional flat(s) for engaging a tool to rotate the piston.
Figure 3:
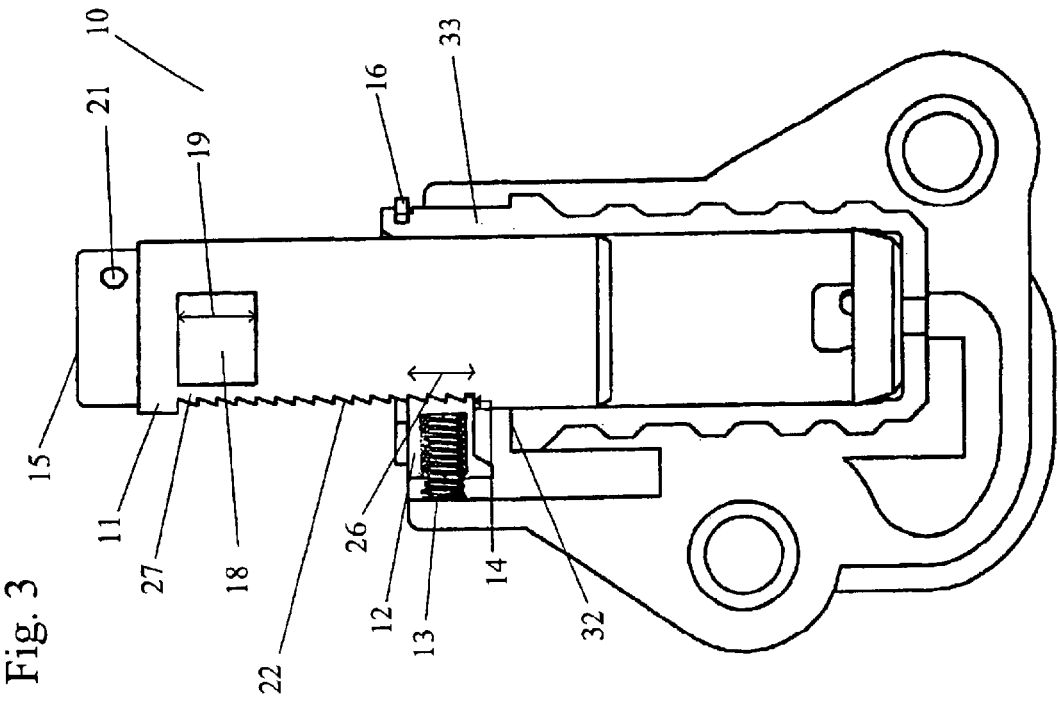
FIG. 3 shows a partial section of the tensioner of the present invention where the piston is fully extended and unlocked, showing a hole for engaging a pin or other tool to rotate the piston.
Figure 8:
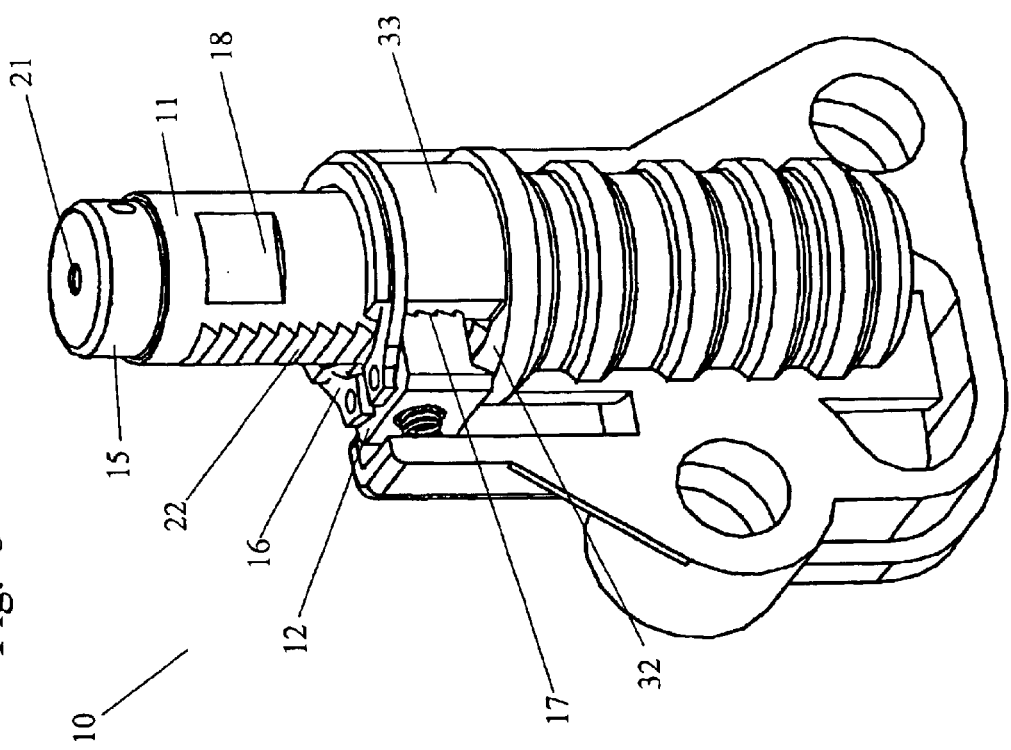
FIG. 8 shows a partial section of the tensioner of the present invention, where the piston is extended in the ratcheting mode to illustrate how the pawl interfaces with the retaining ring and the cylinder's flat and shoulder.
Figure 7:
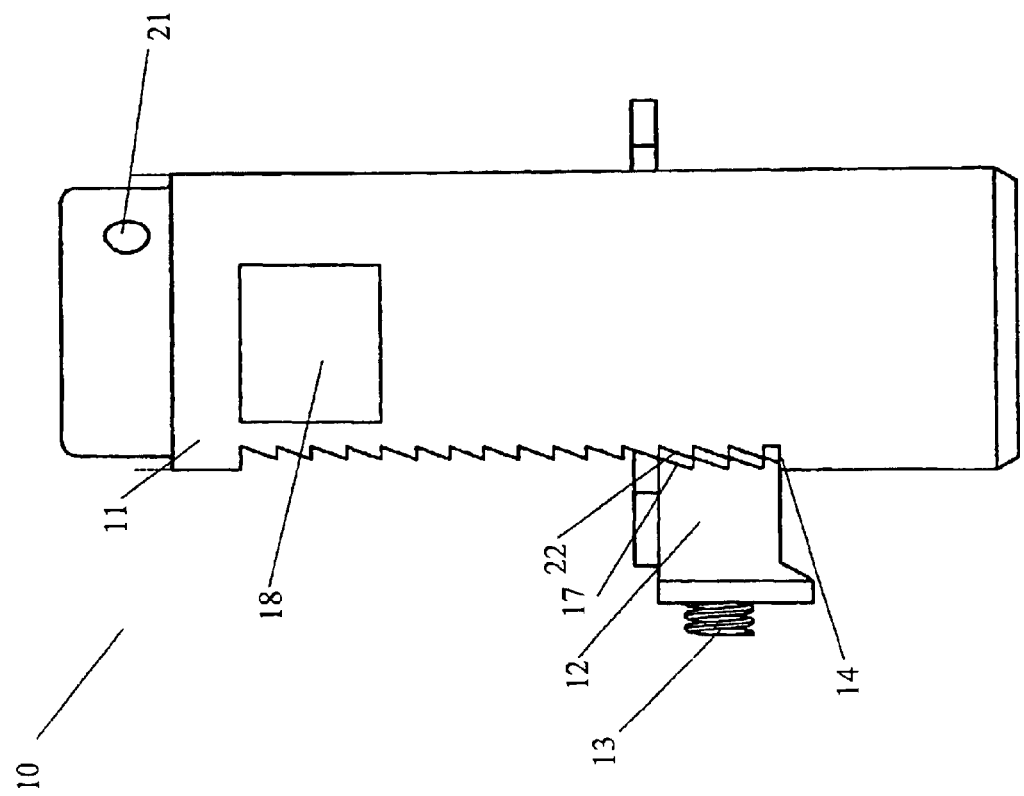
FIG. 7 shows a side view of the tensioner of the present invention with the cylinder and housing removed, where the piston is extended, and the pawl teeth are disengaged from the piston teeth to show that the shoulders still overlap.
Figure 9:
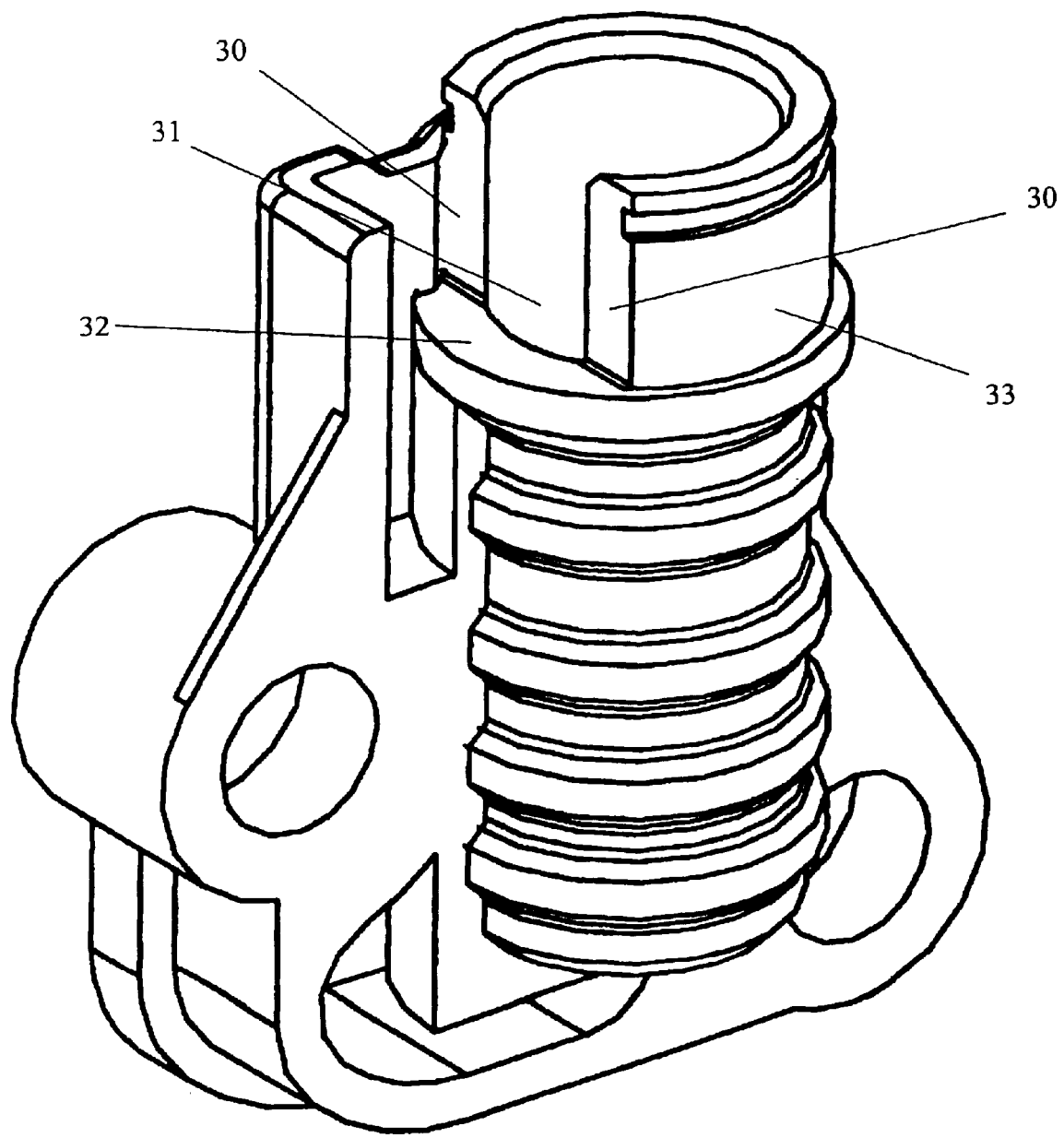
FIG. 9 shows a view of FIG. 8, with the piston and pawl removed.

Referring to FIGS. 2 through 9, the hydraulic piston tensioner (10) of the present invention has a ratcheting interface between a piston skirt (11) and a pawl (12). The tensioner spring (23) biases the piston (15) in the direction of the chain (not shown). The piston (15) is located within a housing (24).

The ratcheting interface between the piston skirt (11) and the pawl (12) contains teeth (22) shaped to allow the piston (15) to extend as the slope of the teeth forces the pawl (12) away from the piston (15) and against its spring (13). Opposing faces of the teeth (22) prevent the piston's compression. The teeth (22) are recessed into the skirt (11) sufficiently to provide a shoulder (14) on which the pawl (12) will impact at a predetermined piston position. Even if the teeth are not engaged, the pawl (12) prevents further extension of the piston (15).

The pawl (12) is located and constrained by a pawl spring (13), a retaining ring (16), and a series of surfaces formed in the cylinder (33) surrounding the piston (15). The pawl spring (13) urges the pawl to remain in contact with the ratchet teeth (22) or the piston skirt (11), depending upon axial orientation of the piston (15). If the piston (15) is absent for any reason, such as during servicing, a pair of flats (30) in the cylinder (33) prevent the pawl (12) from over-extending. During continued service, the same flats (30) act to prevent rotation of the piston (15) within the cylinder bore.

The retaining ring (16) limits the pawl position in the extending piston axial direction. A shoulder (32) in the cylinder (33) limits the position of the pawl (12) in the opposite axial direction, allowing a specified clearance (20) distance for axial pawl motion. In a preferred embodiment, the area of the pawl (12) contacting the shoulder (14) of the skirt (11) is enhanced by providing that the adjacent tooth of the pawl (12) is less than a full tooth. The shoulder (32) is preferably generated by removing a circular segment from the side of the cylinder (33), which creates an opening (31) through the wall. In the figures, the shoulder (32) is illustrated as coinciding with the open end of the cylinder (33), but this is not required.

The clearance (20) allows the required piston backlash. The pawl (12) is carried along by the piston (15) until the retaining ring (16) stops it. The piston's teeth (22) then ratchet with the pawl's teeth (17) until the chain stops the piston's (15) extension. Locking the assembly in this state and then changing the thermal environment, for example in a running engine versus a cold engine, can result in a tightening chain trying to compress the piston (15). This is permitted by the clearance (backlash) (20) between the pawl (12) and the piston's cylinder along the piston's axis.

In a preferred embodiment, the piston skirt (11) includes a locking flat (18) with a depth similar to the ratchet teeth (22) and a length (19) equal to or longer than the thickness (26) of the pawl (12) when measured along the piston's axis. In one embodiment, this locking flat (18) is at a sufficient spacing (27) from the teeth (22) to allow some piston skirt (11) to exist between them, although this is not required. The locking flat (18) is preferably positioned axially with the top of the teeth (22) or lower. The actual axial location of the locking flat (18) is preferably determined by the optimum position of the locked piston (15) during installation.

The piston (15) also preferably includes a hole (21) or additional flat(s) (28) to facilitate rotation. The hole (21) is accessible when the piston (15) is compressed to the locked depth (whether locked or ratcheted), as well as when the piston (15) is extended and tensioning the chain or belt. When the piston (15) is rotated, using the additional flat (28) or hole for purchase, the pawl (12) is released from the locking flat (18).

When the piston (15) is extended and incompressible due to ratchet interface, the tensioner (10) can be released and the piston (15) compressed by simply rotating the piston (15) to disengage the ratchet teeth (22). The piston (15) can be rotated, so that its flat (18) is in alignment with the pawl (12), and then the piston (15) is locked in the shipping position simply by compressing the piston (15) until latched. Reverse rotation releases the piston (15) into the ratcheting mode. The pawl spring (13) resists accidental rotation.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A chain or belt tensioner comprising:
   a) a piston comprising:
      i) a plurality of ratchet teeth along a length of a piston skirt comprising an outer layer of the piston; and
      ii) at least one first locking flat with a depth similar to a depth of the ratchet teeth, wherein the locking flat is positioned along a circumference of the piston and rotationally away from the ratchet teeth; and
   b) a pawl comprising a spring and a plurality of ratchet teeth, wherein the spring forces the ratchet teeth of the pawl against the ratchet teeth of the piston;
   wherein when the piston is rotated from a first position where the ratchet teeth engage the pawl and a second position where the pawl rests in the locking flat, the piston is restrained from axial movement.

2. The chain or belt tensioner of claim 1, wherein a thickness of the pawl is less or equal to a length of the locking flat when measured along an axis of the piston.

3. The chain or belt tensioner of claim 1, wherein the ratchet teeth of the piston ratchet with the ratchet teeth of the pawl until a chain stops an extension of the piston.

4. The chain or belt tensioner of claim 1, further comprising a shoulder along a side of the piston skirt, wherein the pawl is retained along the axis of the piston by the shoulder.

5. The chain or belt tensioner of claim 1, further comprising a retaining ring around a perimeter of the piston skirt, wherein the retaining ring retains the pawl along the axis of the piston.

6. The chain or belt tensioner of claim 1, wherein the locking flat is oriented radially at a sufficient angle from the first plurality of ratchet teeth to allow a portion of the piston skirt to exist between the locking flat and the first plurality of ratchet teeth.

7. The chain or belt tensioner of claim 1, wherein an axial location of the locking flat is determined by an optimum position of the locked piston during installation.

8. The chain or belt tensioner of claim 1, wherein the piston further comprises at least one second flat for rotation of the piston.

9. The chain or belt tensioner of claim 1, wherein the piston further comprises at least one hole for rotation of the piston.

10. The chain or belt tensioner of claim 1, wherein when the piston is restrained from axial movement, the piston is in a locked position.

* * * * *